(12) United States Patent
Johnson et al.

(10) Patent No.: US 8,130,227 B2
(45) Date of Patent: Mar. 6, 2012

(54) DISTRIBUTED ANTIALIASING IN A MULTIPROCESSOR GRAPHICS SYSTEM

(75) Inventors: Philip Browning Johnson, Campbell, CA (US); Brian M. Kelleher, Palo Alto, CA (US); Franck R. Diard, Mountain View, CA (US)

(73) Assignee: NVIDIA Corporation, Santa Clara, CA (US)

(*) Notice: Subject to any disclaimer, the term of this patent is extended or adjusted under 35 U.S.C. 154(b) by 982 days.

(21) Appl. No.: 11/383,048

(22) Filed: May 12, 2006

(65) Prior Publication Data

US 2009/0079747 A1    Mar. 26, 2009

(51) Int. Cl.
*G06T 15/00* (2011.01)
*G09G 5/00* (2006.01)
*G06F 15/16* (2006.01)

(52) U.S. Cl. ........ 345/501; 345/502; 345/589; 345/611; 345/629

(58) Field of Classification Search .......... 345/502, 345/504, 505, 506, 501, 589, 611, 629
See application file for complete search history.

(56) References Cited

U.S. PATENT DOCUMENTS

| | | | | |
|---|---|---|---|---|
| 4,808,984 A * | 2/1989 | Trueblood et al. | | 345/214 |
| 5,012,163 A * | 4/1991 | Alcorn et al. | | 315/383 |
| 5,398,076 A * | 3/1995 | Lum et al. | | 348/676 |
| 5,600,763 A * | 2/1997 | Greene et al. | | 345/420 |
| 5,841,444 A | 11/1998 | Mun et al. | | |
| 5,959,663 A * | 9/1999 | Oba et al. | | 348/46 |
| 6,181,352 B1 | 1/2001 | Kirk et al. | | |
| 6,317,525 B1 | 11/2001 | Aleksic et al. | | |
| 6,359,624 B1 * | 3/2002 | Kunimatsu | | 345/503 |
| 6,412,061 B1 | 6/2002 | Dye | | |
| 6,473,086 B1 | 10/2002 | Morein et al. | | |
| 6,525,738 B1 | 2/2003 | Devins et al. | | |
| 6,549,214 B1 * | 4/2003 | Patel et al. | | 345/660 |
| 6,606,093 B1 * | 8/2003 | Gossett et al. | | 345/441 |
| 6,654,021 B2 | 11/2003 | Wasserman et al. | | |
| 6,760,031 B1 | 7/2004 | Langendorf et al. | | |
| 6,784,881 B2 | 8/2004 | Wasserman et al. | | |
| 6,801,202 B2 | 10/2004 | Nelson et al. | | |
| 6,833,834 B2 | 12/2004 | Wasserman et al. | | |
| 6,847,372 B2 | 1/2005 | Emberling et al. | | |
| 6,882,346 B1 | 4/2005 | Lefebvre et al. | | |
| 6,967,663 B1 * | 11/2005 | Bastos et al. | | 345/613 |
| 2002/0097241 A1 | 7/2002 | McCormack et al. | | |

(Continued)

FOREIGN PATENT DOCUMENTS

GB        2325602 A    11/1998

(Continued)

OTHER PUBLICATIONS

"ATI CrossFire™ Technology White Paper;" 2005; pp. 1-13.*

(Continued)

*Primary Examiner* — Daniel Washburn
(74) *Attorney, Agent, or Firm* — Kilpatrick Townsend & Stockton LLP

(57) ABSTRACT

Multiprocessor graphics systems support distributed antialiasing. In one embodiment, two (or more) graphics processors each render a version of the same image, with a difference in the sampling location (or locations) used for each pixel. A display head combines corresponding pixels generated by different graphics processors to produce an antialiased image. This distributed antialiasing technique can be scaled to any number of graphics processors.

20 Claims, 5 Drawing Sheets

U.S. PATENT DOCUMENTS

| | | | |
|---|---|---|---|
| 2004/0066388 A1* | 4/2004 | Leather et al. ............... 345/611 |
| 2004/0075622 A1 | 4/2004 | Shiuan et al. |
| 2004/0075623 A1 | 4/2004 | Hartman |
| 2004/0151398 A1* | 8/2004 | Betrisey et al. ............... 382/260 |
| 2006/0132491 A1* | 6/2006 | Riach et al. ................... 345/505 |
| 2006/0267991 A1* | 11/2006 | Preetham et al. ............. 345/502 |
| 2007/0085903 A1* | 4/2007 | Zhang ............................ 348/58 |
| 2007/0257935 A1* | 11/2007 | Koduri et al. ................. 345/611 |
| 2009/0085928 A1* | 4/2009 | Riach et al. ................... 345/615 |

FOREIGN PATENT DOCUMENTS

| | | |
|---|---|---|
| JP | 07-319669 A | 12/1995 |
| JP | 8-503563 A | 4/1996 |
| JP | 08-154201 | 6/1996 |
| JP | 10-124038 A | 5/1998 |
| JP | 2001-283213 A | 10/2001 |
| JP | 2004-349842 A | 12/2004 |
| JP | 2006-38979 A | 2/2006 |
| TW | I236650 | 7/2005 |
| TW | 200609728 A | 3/2006 |
| WO | WO 2006/055606 A2 | 5/2006 |

OTHER PUBLICATIONS

Cross, Jason; "Dell Introduces XPS Renegade;" Jan. 5, 2006; PCMAG.com.*

"ASUS Tests 4-Way SLI Multi-GPU Solution;" Nov. 9, 2005; nForcersHQ (http://www.nforcershq.com).*

Wasson, "NVIDIA's SLI resurrects GPU teaming" [online] 2004, p. 2, Retreived from internet: http://www.techreport.com/etc//2004q2/nvidia-sli/index.x?pg=1,28/6/2004page2.

UK Search Report GB0709101.0.

Office Action in related U.S. Appl. No. 11/680,554.

Programmierbare Pixel- und Vertex Shader am Beispiel des GeForce3 von NVIDIA, Technical University Ilmenau, Main Seminar Summer Semester 2001, pp. 1-26.

Wissen:Grafikkarten, PC Games Hardware, Jul. 2005, pp. 1-26.

Danish Search Report SG200703269-1.

Chinese Office Action with English translation of May 8, 2009.

German Search Report and English translation of Nov. 17, 2009.

International Search Report of Feb. 13, 2007.

"NVIDIA lance le SLI: une technologie multi-GPU," Internet Citation, http://www.erenumerique.fr/nvidia_lance_le_sli_une_technologie_multi_gpu-art-655-1.html (Jun. 29, 2004).

Wasson, S., "NVIDIA's SLI resurrects GPU teaming Kickin' it old school?with 32 pipes," Internet citation, http://www.techreport.com/etc/2004q2/nvidia-sli/index.x?pg=1 (Jun. 28, 2004).

JP 2007-128378—Notice of Reasons for Rejection.

Taiwan Office Action.

* cited by examiner

DISTRIBUTED ANTIALIASING IN A MULTIPROCESSOR GRAPHICS SYSTEM

BACKGROUND OF THE INVENTION

The present invention relates in general to computer graphics, and in particular to antialiasing of image data using distributed rendering techniques.

As is known in the art, computer-generated images are susceptible to various visual artifacts resulting from the finite sampling resolution used in converting the image data to an array of discrete color samples (pixels). Such artifacts, generally referred to as "aliasing," include jaggedness in smooth lines, irregularities in regular patterns, and so on.

To reduce aliasing, color is often sampled at a number of sampling locations that exceeds the number of pixels making up the final (e.g., displayed or stored) image. For instance, an image might be sampled at twice or four times the number of pixels. The samples are then blended (or filtered) to generate a single pixel value for the final image. Various types of oversampling are known in the art, including supersampling, in which each sampling location is treated as a separate pixel, and multisampling, in which a single color value is computed for each primitive that covers at least part of the pixel, but coverage of the pixel by the primitive is determined at multiple locations.

While oversampling does reduce aliasing effects, it also increases the computational burden associated with generating the image. For instance, in supersampling, each sample location requires a new color computation; thus, the number of operations required to generate an image scales with the number of sample locations This computational burden can limit the ability of existing systems to make use of oversampling in real-time applications.

To increase the computing power available to generate images, some computer systems employ multiple graphics processors, with rendering tasks distributed among the processors. For instance, each graphics processor might be assigned to render a different portion of an image, or different graphics processors might be assigned to render different images in a sequence (e.g., for video game animation or the like). Pixels from each graphics processor are provided to a display head, which selects a pixel from one graphics processor or another to be used in the final image.

It would be desirable to exploit the combined computational power of multiple graphics processors to perform antialiasing. Existing systems, however, do not support this, in part because the selection logic in the display head makes only either/or selections between pixels rendered by different graphics processors.

BRIEF SUMMARY OF THE INVENTION

Embodiments of the present invention provide distributed antialiasing (AA) in multiprocessor graphics systems. Two (or more) graphics processors each render a version of the same image, with some difference in the sampling location (or locations) used for each pixel. A display head is configured to combine corresponding pixels generated by different graphics processors to produce an AA-filtered image. In some embodiments, this distributed AA mechanism is fast and scalable to any number of graphics processors.

According to one aspect of the present invention, a display head for a graphics processor includes a first input path, a second input path, a pixel combiner and a multiplexer. The first input path is configured to propagate a first pixel generated by a first graphics processor. The second input path is configured to propagate a second pixel generated by a second graphics processor. The pixel combiner, which is coupled to the first input path and the second input path, is configured to blend the first pixel and the second pixel to generate a blended pixel. The multiplexer configured to select one of the first pixel, the second pixel, or the blended pixel as an output pixel.

In some embodiments, the display head also includes a division circuit configured to divide the output pixel by a divisor (e.g., 1 or 2 or other divisor). In some embodiments, the pixel combiner includes a division circuit configured to divide the first pixel by a divisor (e.g., 1, 2, 4 or other divisor) prior to blending the first pixel and the second pixel.

In some embodiments, the pixel combiner is configured to generate the blended pixel by adding the first pixel and the second pixel. In other embodiments where the first pixel and the second pixel are gamma-corrected pixels, the pixel combiner may be configured to generate the blended pixel by computing a gamma-corrected blend of the first pixel and the second pixel.

According to another aspect of the present invention, a graphics processor includes a display pipeline, an input port, and a display head. The display pipeline is configured to generate a first pixel. The input port is configured to receive a second pixel from an external pixel source. The display head has a first input path, a second input path, a pixel combiner and a multiplexer. The first input path is coupled to the display pipeline and configured to receive the first pixel from the display pipeline. The second input path is coupled to the input port and configured to receive the second pixel from the input port. The pixel combiner is coupled to the first input path and the second input path and is configured to blend the first pixel and the second pixel to generate a blended pixel. The multiplexer is configured to select one of the first pixel, the second pixel, or the blended pixel as an output pixel.

According to another aspect of the present invention, a method of generating an image includes rendering a first set of input pixels for the image using a first graphics processor and rendering a second set of input pixels for the image using a second graphics processor. The respective rendering operations performed by the first and second graphics processors differ in at least one respect. The first set of input pixels and the second set of input pixels are delivered to a first display head. In the first display head, corresponding pixels of the first set of input pixels and the second set of input pixels are blended to generate a first set of output pixels. In some embodiments, the first display head is in the first graphics processor.

The respective rendering operations performed by the first and second graphics processors may differ in various ways. For instance, they may differ with respect to a sampling pattern applied to each pixel or with respect to a viewport offset of the image being rendered.

In some embodiments, the image includes a workstation desktop having an application window defined thereon, the application window displaying a three-dimensional computer-generated graphic, and the respective rendering operations performed by the first and second graphics processors differ with respect to pixels in the application window. Desktop pixels for an area of the workstation desktop outside the application window can be generated, e.g., by a central processor and delivered to the first graphics processor and the second graphics processor, so that corresponding pixels in the first set of input pixels and the second set of input pixels are identical in the area of the workstation desktop outside the application window.

In some embodiments, the first set of output pixels is delivered to a display device. In other embodiments, the first set of output pixels is combined with other sets of output pixels rendered using other graphics processors. For instance, a third set of input pixels for the image may be rendered using a third graphics processor, and a fourth set of input pixels for the image may be rendered using a fourth graphics processor; respective rendering operations performed by the first, second, third, and fourth graphics processors differ from each other in at least one respect. The first set of output pixels and the third set of input pixels are delivered to a second display head, where corresponding pixels of the first set of output pixels and the third set of input pixels are blended to generate a second set of output pixels. The second set of output pixels and the fourth set of input pixels are delivered to a third display head, where corresponding pixels of the second set of output pixels and the fourth set of input pixels are blended to generate a third set of output pixels. The second display head might be in the third graphics processor while the third display head might be in the fourth graphics processor.

The following detailed description together with the accompanying drawings will provide a better understanding of the nature and advantages of the present invention.

DETAILED DESCRIPTION OF THE INVENTION

Embodiments of the present invention provide distributed antialiasing (AA) in multiprocessor graphics systems. Two (or more) graphics processors each render a version of the same image, with some difference in the sampling location (or locations) used for each pixel. A display head is configured to combine corresponding pixels generated by different graphics processors to produce an AA-filtered image. In some embodiments, this distributed AA mechanism is fast and scalable to any number of graphics processors.

System Overview

Figure 1:
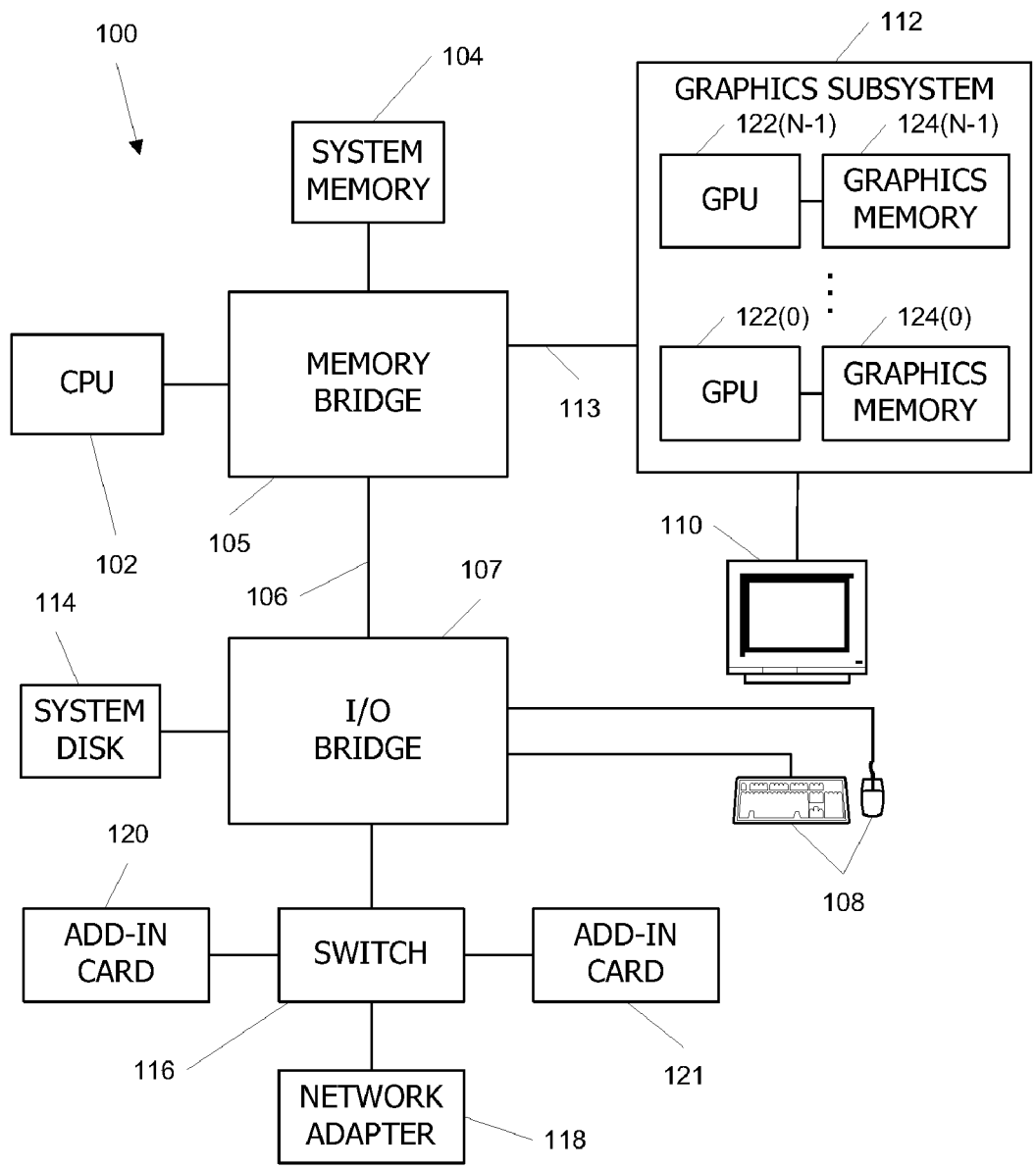
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Advanced Graphics Processing), Hypertransport, or any other bus protocol(s), and connections between different devices may use different protocols as is known in the art.

Graphics subsystem 112 includes a number N of graphics processing units (GPUs) 122, where N is at least 2. (Herein, multiple instances of like objects are denoted with reference numbers identifying the object and parenthetical numbers identifying the instance where needed.) Each GPU 122 has an associated graphics memory 124. GPUs 122 and graphics memories 124 may be implemented, e.g., using one or more integrated circuit devices such as programmable processors, application specific integrated circuits (ASICs), and memory devices. In some embodiments, GPUs 122 and graphics memories 124 are implemented in one or more expansion cards or other adapters that can be inserted into and removed from expansion slots (e.g., PCI-E slots) in system 100. Any number N (2 or more) of GPUs 122 may be used.

Each GPU 122 may be configured to perform various tasks related to generating pixel data (also referred to herein as "pixels") from graphics data supplied by CPU 102 and/or system memory 104 via memory bridge 105 and bus 113, interacting with a respective graphics memory 124 to store and update pixel data, and the like. For example, a GPU 122 may generate pixel data from 2-D or 3-D scene data provided by various programs executing on CPU 102. A GPU 122 may also write pixel data received via memory bridge 105 to graphics memory 124 with or without further processing. Each GPU 122 also includes a scanout module (also referred to herein as a display pipeline) that can be configured to deliver pixel data from graphics memory 124 an output port of the GPU 122 as described below. The output port might or might not be connected to a monitor or to another GPU 122.

For operations in a distributed rendering mode, one GPU (e.g., GPU 122(0)) is advantageously configured to deliver scanned-out pixels to another GPU (e.g., GPU 122(N−1)), which selects between internal pixels from its own display pipeline and external pixels received from GPU 122(0). More than two GPUs 122 can be interconnected in a "daisy-chain" fashion, such that a slave GPU 122 delivers its pixels to an intermediate GPU 122, which selects between its internal pixel and the external pixel from the slave, then forwards the selected pixel to another GPU, and so on until the ultimate master GPU (i.e., the GPU connected to a monitor) delivers the final selected pixels to a display device.

In some embodiments, GPUs 122 can be interconnected with each other in such a way that any GPU 122 can be slaved to any other GPU 122 by adjusting configuration settings of the GPUs 122 without any alteration of the physical connections. For instance, GPUs 122 can be connected in a unidirectional or bidirectional ring topology.

Various distributed rendering modes can be supported. For instance, in split-frame rendering, different GPUs 122 are assigned to render different portions of the same image; in alternate frame rendering, different GPUs 122 are assigned to render different images in a sequence of images to be displayed. A particular distributed rendering mode is not critical to the present invention.

In accordance with an embodiment of the present invention, GPUs 122 are also operable in a distributed AA mode. In this mode, pixel selection logic in the GPUs 122 blends internal and external pixels rather than selecting either pixel to the exclusion of the other. Where the internal and external pixels represent the same image with different sampling locations, the result of blending the pixels corresponds to an AA resolve operation (also referred to herein as an AA filter). Examples of distributed AA modes and associated pixel selection logic are described below.

In some embodiments, some or all of GPUs 122 may be also operable in an "independent rendering" mode in which different ones of GPUs 122 render images for different display devices; the images rendered by different GPUs 122 in an independent rendering mode might or might not be related to each other. It is to be understood that GPUs 122 may be configurable to operate in any of the above or other modes.

CPU 102 operates as the master processor of system 100, controlling and coordinating operations of other system components. In particular, CPU 102 issues commands that control the operation of GPUs 122. The commands may include conventional rendering commands for generating images as well as general-purpose computation commands that enable applications executing on CPU 102 to leverage the computational power of GPUs 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPUs 122 to the rest of system 100 may also be varied. In some embodiments, graphics subsystem 112 is implemented using one or more expansion cards that can be inserted into expansion slots of system 100, with one or more GPUs 122 on each card. In other embodiments, one or more of GPUs 122 is integrated on a single chip with a bus bridge, such as memory bridge 105 or I/O bridge 107.

Each GPU may be provided with any amount of local graphics memory, including no local memory, and may use local memory and system memory in any combination. For instance, in a unified memory architecture (UMA) embodiment, little or no dedicated graphics memory is provided, and some or all of the GPUs may system memory exclusively or almost exclusively. In UMA embodiments, a GPU may be integrated into a bus bridge chip or provided as a discrete chip with a high-speed bus (e.g., PCI-E) connecting the GPU to the bridge chip and system memory.

In addition, graphics subsystems embodying aspects of the present invention may be incorporated into a variety of devices, including general purpose computer systems, video game consoles and other special purpose computer systems, DVD players, handheld devices such as mobile phones or personal digital assistants, and so on.

Distributed Anti-Aliasing Mode

Figure 2:
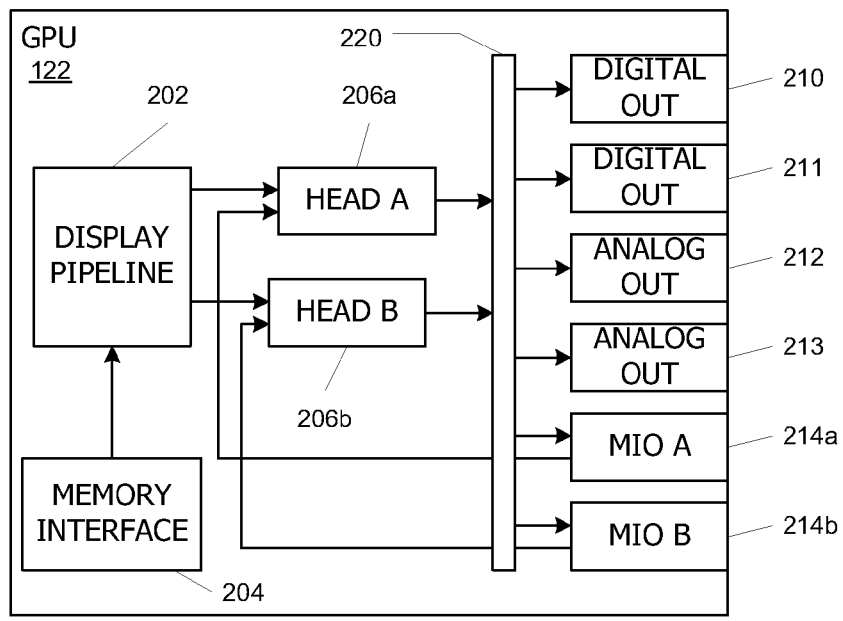
FIG. 2 is a block diagram of a pixel output path in a graphics processor usable to practice the present invention.

FIG. 2 is a block diagram of a pixel output path in a GPU 122 usable to practice the present invention. It is to be understood that a similar path is advantageously present in each GPU 122. As shown in FIG. 2, GPU 122 includes a display (or scanout) pipeline 202 coupled to a memory interface 204. Display pipeline 202 is also coupled to display heads 206a ("head A") and 206b ("head B"). GPU 122 has multiple output ports 210-213, including digital output ports 210, 211, and analog output ports 212, 213. GPU 122 also has two multipurpose input/output (MIO) ports 214a ("MIO A") and 214b ("MIO B") that are configurable for various purposes, including communication with another GPU or with another external digital device. Display heads 206a and 206b are each coupled to output ports 210-213 and MIO ports 214a, 214b via a crossbar 220.

Memory interface 204 is coupled to a memory (not shown in FIG. 2), e.g., graphics memory 124 of FIG. 1, that stores pixel data generated by GPU 122. Display pipeline 202 communicates with memory interface 204 to access the stored pixel data. Display pipeline 202 delivers the pixel data to either or both of display heads 206a, 206b. In some embodiments, display pipeline 202 may perform various processing operations on the pixel data before delivering it to display heads 206a, 206b, and pixel data destined for display head 206a might or might not be processed differently from pixel data destined for display head 206b. The particular configuration of display pipeline 202 and memory interface 204 is not critical to the present invention, and a detailed description is omitted.

Digital output ports 210, 211 may be of generally conventional design and may include circuits that modify the pixel data to conform to a digital output standard. For instance, in one embodiment, each of ports 210, 211 implements TMDS (Transition Minimized Differential Signaling) for a standard DVI (Digital Video Interface) connector. Similarly, analog output ports 212, 213 can be of generally conventional design and may include, e.g., a digital to analog converter conforming to any analog video standard, numerous examples of which are known in the art. It will be appreciated that the presence, absence, number, or nature of particular digital or analog output ports is not critical to the present invention.

MIO A port 214a and MIO B port 214b can be configured as output ports that drive pixel data produced by either of display heads 206a, 206b onto output lines of GPU 122. MIO A port 214a and MIO B port 214b can also be configured as input ports that delivers external pixel data to display head A 206a or display head B 206b. In some embodiments, MIO A port 214a and MIO B 214b are each independently configurable as either an input port or an output port. The configuration of MIO A port 214a and MIO B port 214b may be determined during system startup or dynamically modified at various times during system operation. For instance, each MIO port may include a control register that stores a value specifying the port configuration, and a new value may be written to the register at system startup or at other times as desired.

Head A 206a and head B 206b are each coupled to output ports 210-213, as well as to MIO ports 214a, 214b via crossbar 220. In this embodiment, crossbar 220 is configurable to support any connection between head A 206a and any one of ports 210-213, 214a, or 214b and to simultaneously support any connection between head B 206b and any one of ports 210-213, 214a, or 214b that is not currently connected to head A 206a. For instance, GPU 122 can simultaneously drive pixel data from heads 206a, 206b to two different monitors (e.g., via any two of digital output ports 210, 211 and/or analog output ports 212, 213). Alternatively, GPU 122 can simultaneously drive pixels to a monitor via one of output ports 210-213 and to another GPU via MIO A port 214a or MIO B port 214b. In some instances, one or both of display heads 206a, 206b may be idle, i.e., not delivering pixels to any output port.

In some embodiments, crossbar 220 is configured at system startup; in other embodiments, crossbar 220 is dynamically configurable, so that the connections can be changed during system operation. Crossbar 220 may also be configurable to couple incoming pixel data received at one of MIO ports 214a, 214b to either of display heads 206a, 206b.

MIO ports 214a, 214b can also be configured to receive pixel data from another one of GPUs 122 and to communicate the received pixel data into display heads 206a, 206b. Each GPU 122 also has selection logic in each display head 206a, 206b to select between an "external" pixel received from one of MIO ports 214a, 214b and an "internal" pixel received from its own display pipeline 202, or a combination of the internal and external pixels.

Figure 3:
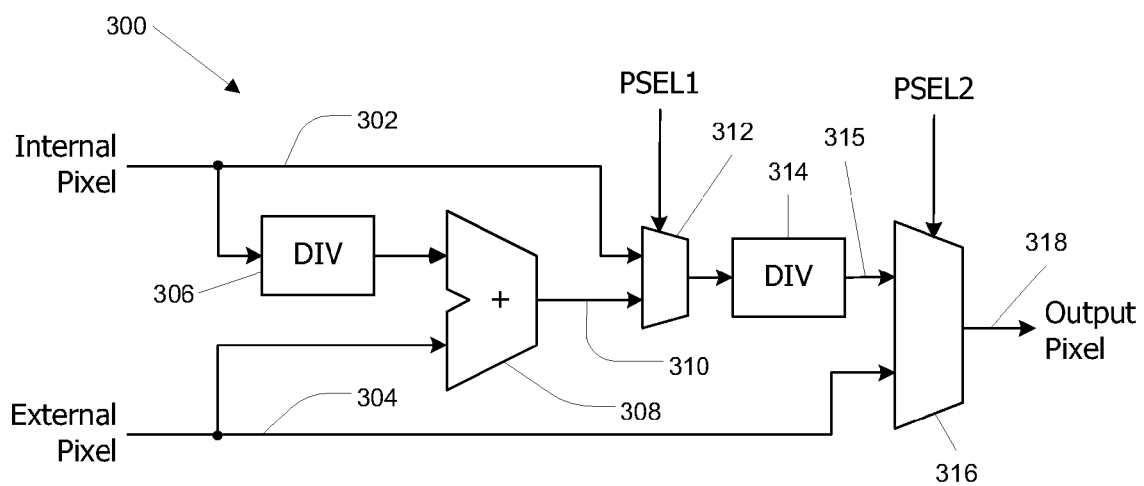
FIG. 3 is a block diagram of pixel selection logic for a multiprocessor graphics subsystem according to an embodiment of the present invention.

FIG. 3 is a block diagram of pixel selection logic 300 in display head 206a of a GPU 122 according to an embodiment of the present invention. It is to be understood that display head 206b may have pixel selection logic of similar design. In some embodiments, each display head 206a, 206b of each GPU 122 has its own pixel selection logic 300.

Pixel selection logic 300 receives an internal pixel on a first path 302 from display pipeline 202 of FIG. 2. The internal pixel is propagated through a first division circuit 306 to an addition circuit 308. Division circuit 306, which may be of generally conventional design, is advantageously configured to divide the internal pixel (i.e., the value represented on signal path 302) by one of a number of candidate divisors (e.g., 1, 2, 4, etc.). When MIO A port 214a of FIG. 2 (or in some embodiments, MIO B port 214b) is configured as an input port, pixel selection logic 300 also receives an external pixel on a second path 304. The external pixel is also propagated to addition circuit 308.

Addition circuit 308, which may be of generally conventional design, adds the internal and external pixels, providing the sum as a pixel on signal path 310. A first selection multiplexer 312 receives the internal pixel on path 302 and the "sum" pixel on path 310. In response to a first pixel selection signal (PSEL1), multiplexer 312 selects either the internal pixel or the sum pixel for delivery to a second division circuit 314. Division circuit 314 is advantageously configured to divide the pixel selected by multiplexer 312 by one of a number of candidate divisors (e.g., 1, 2, etc.), providing the result as a blended pixel on a path 315.

The blended pixel on path 315 and the external pixel on path 304 are both provided to a second selection multiplexer 316. In response to a second pixel selection signal (PSEL2), multiplexer 316 selects either the blended pixel or the external pixel for delivery to an output path 318 that connects to crossbar 220 of FIG. 2.

Division circuits 306 and 314 may be, but are not required to be, general-purpose arithmetic circuits. For example, some digital circuits implement binary arithmetic such that division by a power of 2 (2, 4, etc.) can be implemented as a right-shift by a selected number of bits, with or without rounding logic as desired. "Division by 1" can be implemented by passing the input values through without alteration. Thus, in embodiments where the divisors are always powers of 2, bit shifting logic can be used to implement fast division operations. Division circuits 306 and 314 are advantageously used to implement AA filters, with equal or unequal weights being applied to pixels generated by different GPUs 122; examples of such filters are described below.

The PSEL1 and PSEL2 signals, which control selection multiplexers 312 and 316, respectively, are advantageously generated by control logic (not explicitly shown) in display head 206a. In some embodiments, this control logic, which may be of generally conventional design, is responsive to control information generated by a graphics driver program executing on CPU 102 of FIG. 1. Similarly, division circuits 306 and 314 advantageously select divisors to use in response to control information generated by the graphics driver program. Those skilled in the art with access to the present teachings will be able to implement suitable control logic for generating PSEL1 and PSEL2 signals and for selecting divisors; accordingly, a detailed description of the control logic is omitted.

It will be appreciated that the display heads and pixel selection logic described herein are illustrative and that variations and modifications are possible. For example, the division circuits described herein support division by a small number of discrete divisors. In other embodiments, the division circuits might support a larger number of divisors (including arbitrarily selected divisors) so that a broad range of antialiasing filters can be supported. Further, the division circuits may be placed at different locations from those described herein, and the number of division circuits may be modified. For instance, a division circuit might be placed on the external pixel path in addition to or instead of the internal pixel path.

The particular arrangement of selection multiplexers shown in FIG. 3 is also illustrative and may be modified. One alternative embodiment is described below with reference to FIG. 9. Those skilled in the art will recognize that any circuit element or combination of circuit elements capable of controllably selecting among the internal pixel, the external pixel, and a blended pixel derived from both the internal and external pixel may be used as a selection circuit.

As used herein, a "pixel" refers generally to any representation of a color value sampled at some location within an image, or to a combination of such values (e.g., as produced by addition circuit 308 of FIG. 3). Rendering pipelines in the GPUs generate pixels at a nominal resolution (where resolution refers to the number of pixels in the image), which might or might not coincide with the resolution of the display device. In some embodiments, the display pipeline performs any needed up-filtering or down-filtering to transform the nominal resolution to the display resolution.

The labeling of MIO ports and display heads herein as "A" and "B" herein is solely for convenience of description. It is to be understood that any MIO port can be connected to any other MIO port, and either display head can drive either MIO port when that port is configured as an output port. In addition some GPUs may include more or fewer than two MIO ports and/or more or fewer than two display heads.

In general, any port or ports that enable one GPU to communicate pixel data with another GPU may be used as I/O ports to practice the present invention. In some embodiments, the MIO ports are also reconfigurable for purposes other than communicating with another GPU, as noted above. For instance, the MIO ports can be configured to communicate with various external devices such as TV encoders or the like; in some embodiments, DVO (Intel Corporation's Digital Video Output Interface) or other standards for video output can be supported. In some embodiments, the configuration of each MIO port is determined when a graphics adapter is assembled; at system startup, the adapter notifies the system as to the configuration of its MIO ports. In other embodiments, the MIO ports may be replaced with dedicated input or output ports.

Configuration of I/O ports, display heads, and other aspects of a graphics subsystem may be accomplished by a system setup unit configured to communicate with all of the graphics processors. In some embodiments, the system setup unit is implemented in a graphics driver program that executes on a CPU of a system that includes a multi-processor graphics subsystem. Any other suitable agent, including any combination of hardware and/or software components, may be used as a system setup unit.

Operation of pixel selection logic 300 to support distributed antialiasing modes will now be described.

Figure 4A:
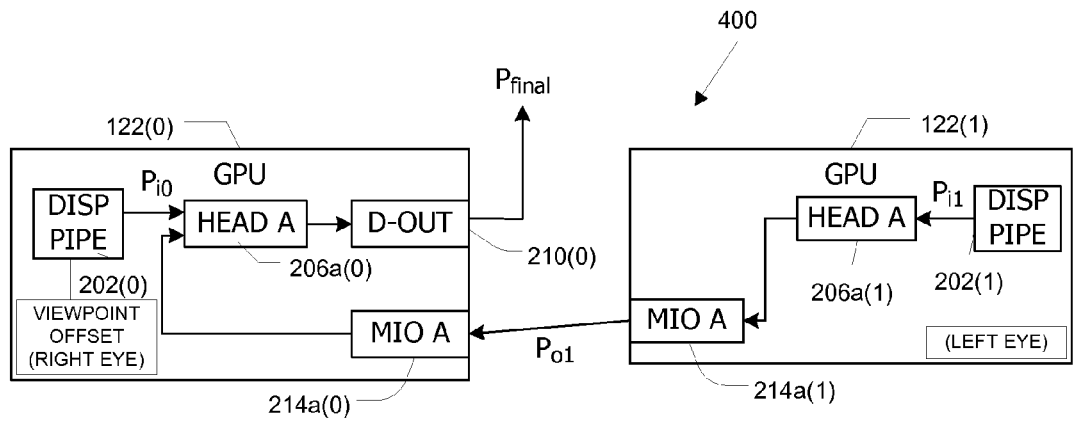
FIGS. 4A and 4B are simplified block diagrams of graphics subsystems according to an embodiment of the present invention.

FIG. 4A is a simplified block diagram of a graphics subsystem 400 having two GPUs 122(0) and 122(1) in a master/slave readout configuration. (For clarity, only the active ports and display heads are shown; in this example, only one display head per GPU is in use.) A slave GPU 122(1) has its MIO A port 214a(1) configured as an output port, while a master GPU 122(0) has its MIO A port 214a(0) configured as an input port. MIO A port 214a(1) is coupled to MIO A port 214a(0), allowing output pixels $P_{o1}$ to flow from slave GPU 122(1) to master GPU 122(0).

Head A 206a(1) of slave GPU 122(1) forwards pixels $P_{i1}$ provided by display pipeline 202(1) of slave GPU 122(1) as output pixels to MIO A port 214a(1). Output pixels $P_{o1}$ from GPU 122(1) are received by MIO A port 214a(0) of master GPU 122(0), which forwards the pixels to display head A 206a(0). In head A 206a(0), pixel selection logic 300(0) (an instance of pixel selection logic 300 of FIG. 3) operates to select internal pixels $P_{i0}$ from display pipeline 202(0) of master GPU 122(0), external pixels $P_{o1}$ originating in display pipeline 202(1) of slave GPU 122(1), or sums (e.g., $P_{i0}+P_{o1}$) supplied by addition circuit 308.

Head A 206a(0) of master GPU 122(0) delivers the selected pixels ($P_{final}$) to an output port, in this case digital output port 210(0). It will be appreciated that head A 206a(0) of GPU 122(0) could be configured to deliver pixel data to MIO B port 214b(0) (not explicitly shown in FIG. 4A), which could be connected to an MIO port of a third GPU 122; the third GPU 122 would then be a master to GPU 122(0). Thus, any number of GPUs 122 may be connected in a daisy chain.

In accordance with an embodiment of the present invention, GPUs 122(0) and 122(1) can be used in a distributed antialiasing (AA) mode. In this mode, each GPU 122 renders the same image, with some variation in a viewing parameter or sampling parameter such that the sampling locations used by GPU 122(0) are different from the sampling locations used by GPU 122(1). For example, slightly different viewports or viewplane normals might be defined for the two GPUs 122, creating small offsets in the pixel boundaries of the two images. Alternatively, where the sampling location within a pixel is configurable (e.g., by the graphics driver), each GPU 122 might be configured to use the same set of viewing parameters but a different sampling location within each pixel.

In a distributed AA mode, the external pixels $P_{o1}$ and internal pixels $P_{i0}$ received by pixel selection logic 300(0) in display head 206a(0) of GPU 122(0) correspond to different sampling locations for the same pixel of the final image. Averaging the internal and external pixels provides antialiasing at twice the display resolution. More specifically, selection multiplexer 310 is configured to select the pixel sum $P_{o1}+P_{i0}$ provided by adder circuit 308, and division circuit 314 is configured to divide the selected pixel sum by 2, so that the final pixel is $P_{final}=(P_{o1}+P_{i0})/2$. In this manner, pixel selection logic 300 can implement a 2×AA filter.

Figure 4B:
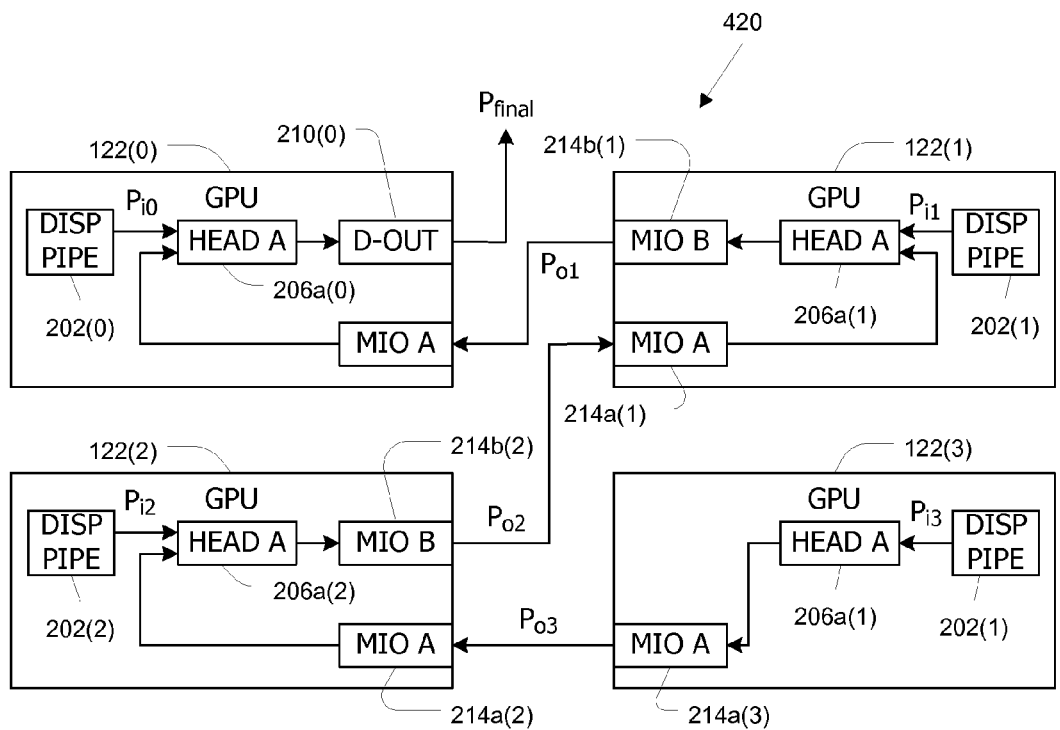

It should be noted that GPUs 122(0) and 122(1) can also be operated in other distributed rendering modes, including modes in which one of the internal pixel or the external pixel is selected to the exclusion of the other. The particular selection will depend on the specifics of the distributed rendering mode, e.g., whether different GPUs 122 are rendering different portions of the same frame or different successive frames, and is not relevant to the present invention.

Where more than two GPUs 122 are present, a higher degree of antialiasing can be achieved. FIG. 4B is a simplified block diagram of a graphics subsystem 420 having four GPUs 122(0)-122(3) arranged in a daisy-chain readout configuration according to an embodiment of the present invention. For clarity, only the active ports and display heads are shown. GPU 122(3), the ultimate slave in subsystem 420, has its MIO A port 214a(3) configured as an output port, while a second GPU 122(2) has its MIO A port 214a(2) configured as an input port. MIO A port 214a(3) is coupled to MIO A port 214a(2), allowing pixels $P_{o3}$ to flow from GPU 122(3) to GPU 122(2).

Head A 206a(3) of GPU 122(3) forwards pixels $P_{i3}$ provided by display pipeline 202(3) of GPU 122(3) to MIO A port 214a(3), which forwards the pixels as output pixels $P_{o3}$ to head A 206a(2). In head A 206a(2), pixel selection logic 300(2) (an instance of pixel selection logic 300 of FIG. 3) operates to select internal pixels $P_{i2}$ from display pipeline 202(2) of GPU 122(2), external pixels $P_{o3}$ supplied by GPU 122(3), or sum pixels supplied by addition circuit 308, as output pixels $P_{o2}$.

Head A 206a(2) of GPU 122(2) delivers pixels $P_{o2}$ to MIO B port 214b(2). MIO B port 214b(2) in turn is connected to MIO A port 214a(1) of GPU 122(1), so that GPU 122(2) is slaved to GPU 122(1).

In head A 206a(1) of GPU 122(1), pixel selection logic 300(1) operates to select internal pixels $P_{i1}$ from display pipeline 202(1) of GPU 122(1), external pixels $P_{o2}$ supplied by GPU 122(2), or sum pixels supplied by addition circuit 308, as output pixels $P_{o1}$. Head A 206a(1) of GPU 122(1) delivers output pixels $P_{o1}$ to MIO B port 214b(1). MIO B port 214b(1) in turn is connected to MIO A port 214a(0) of GPU 122(0), so that GPU 122(1) is slaved to GPU 122(0).

GPU 122(0) is the ultimate master in subsystem 420. In head A 206a(0) of GPU 122(0), selection logic 300(0) operates to select internal pixels $P_{i0}$ from display pipeline 202(0) of GPU 122(0), external pixels $P_{o1}$ supplied by GPU 122(1), or sum pixels supplied by addition circuit 308, as final output pixels $P_{final}$. Head A 206a(0) of GPU 122(0) delivers the final pixels $P_{final}$ to an output port, in this case digital output port 210(0).

In a distributed AA mode, the pixel selection logic circuits 300(0)-300(2) in respective display heads 214a(0)-214a(2) of GPUs 122(0)-122(2) are each configured to select sum pixels. Division circuits 306 and 314 in each head 214a(0)-214a(2) are configured to apply appropriate weighting factors at each stage, so that the final result corresponds to an equally-weighted average of the internal pixels $P_{i0}$, $P_{i1}$, $P_{i2}$, $P_{i3}$. Pixel selection logic 300(3) in GPU 122(3) is configured to select the internal pixel $P_{i3}$, so that $P_{o3}=P_{i3}$.

In one embodiment, in GPU 122(2), division circuit 306 divides $P_{i2}$ by 1, and division circuit 316 divides the sum of $P_{i2}$ and $P_{o3}$ by 2. Thus, $$P_{o2}=(P_{i2}+P_{o3})/2=(P_{i2}+P_{i3})/2, \qquad (Eq.\ 1)$$

since $P_{o3}=P_{i3}$. In GPU 122(1), division circuit 306 divides $P_{i1}$ by 2, and division circuit 314 divides the sum by 2. Thus, $$P_{o1}=(P_{i1}/2+P_{o2})/2 \approx P_{i1}/4+P_{i2}/4+P_{i3}/4, \quad \text{(Eq. 2)}$$

where the second equality is approximate due to rounding effects and the like.

In GPU 122(0), division circuit 306 divides $P_{i0}$ by 4, and division circuit 314 divides the sum by 1. Thus, $$P_{final}=P_{i0}/4+P_{o1} \approx P_{i0}/4+P_{i1}/4+P_{i2}/4+P_{i3}/4, \quad \text{(Eq. 3)}$$

where again the second equality is approximate due to rounding effects and the like. As Eq. 3 indicates, the final pixel is approximately an equally-weighted average of the four pixels generated by GPUs 122(0)-122(3). Thus, the configuration shown in FIG. 4B can be used for 4×AA filtering.

It should be noted that GPUs 122(0)-122(3) can also be operated in other distributed rendering modes, including modes in which one of the internal pixel or the external pixel is selected to the exclusion of the other. In addition, "hybrid" modes may also be implemented, in which some GPUs render versions of the same image (or portion of an image) while other GPUs render versions of a different image (or portion of an image). For instance, in a split-frame rendering mode with four GPUs, two GPUs can be used to render each portion of the frame with pixel selection logic 300 being used for a 2×AA filter. More specifically, GPUs 122(2) and 122(3) might each render a top portion of the same image with an offset in their sampling locations, while GPUs 122(0) and 122(1) each render a bottom portion of the same image with an offset in their sampling locations. Display head 206a(2) would compute an average of $P_{o3}$ and $P_{i2}$ and forward this average as $P_{o2}$ to GPU 122(1). Display head 206a(1) would select external pixels $P_{o2}$ for pixels in the top portion of the frame and internal pixels $P_{i1}$ for pixels in the bottom portion of the frame, forwarding the selected pixel as $P_{o1}$ to GPU 122(0). Display head 206a(0) would select $P_{o2}$ for pixels in the top portion of the frame; for the bottom portion of the frame, display head 206a(0) would compute and select an average of $P_{o1}$ and $P_{i0}$.

Similarly, an alternate frame rendering mode with four GPUs may be implemented. In one such mode, two GPUs are assigned to render each frame; e.g., GPUs 122(0) and 122(1) might be assigned to render the first frame in a sequence while GPUs 122(2) and 122(3) are assigned to render the second frame, and so on.

Those skilled in the art will appreciate that beyond a certain point (e.g., 16 or 32 samples per pixel), generating additional samples per pixel provides negligible further improvement in image quality. Thus, in systems with large numbers of GPUs (e.g., more than four), it may be preferable to partition the rendering work among groups of two or four GPUs, with each group performing distributed AA (e.g., at 8× or 16×) on its assigned portion of the rendering work. It is to be understood that split frame rendering, alternate frame rendering, or a combination thereof may be used to partition work among groups of GPUs and that a group may include any number of GPUs.

It will be appreciated that the graphics subsystem configurations described herein is illustrative and that variations and modifications are possible. For instance, in some embodiments, rather than performing the various division operations described herein, the pixel selection logic might be configured to compute a running sum and divide only at the output of the master GPU. In addition, the present invention is not limited to embodiments where two or four GPUs are used for distributed AA. Any number of GPUs may be used. The relative weights assigned to various samples may also be modified from the equal weightings described herein. Those skilled in the art will recognize that the pixel selection logic described above can be modified to support a wide range of AA filters.

Distributed and Internal Anti-Aliasing Combined

As described above, distributed AA filtering generally involves combining pixels generated by different GPUs. In some embodiments of the present invention, each GPU may perform its own (internal) AA filter, in addition to the distributed AA filter, further increasing the antialiasing power of the graphics subsystem.

Figure 5:
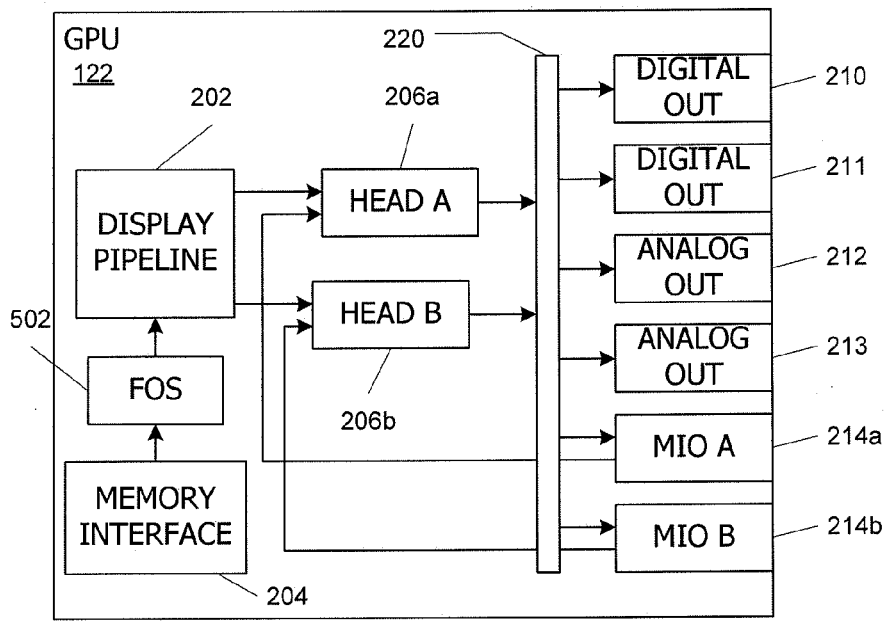
FIG. 5 is a block diagram of another pixel output path in a graphics processor usable to practice the present invention.

FIG. 5 is a block diagram of a pixel output path in a GPU 122 usable to practice the present invention. It is to be understood that a similar path may be present in each GPU 122. The pixel output path shown in FIG. 5 is generally similar to that shown in FIG. 2, except that in FIG. 5, the output path includes a filter-on-scanout (FOS) module 502 that performs an internal AA filter. More specifically, a rendering pipeline (not explicitly shown) in GPU 122 generates a number N (e.g., 2, 4 or more) of samples per pixel, e.g., using conventional supersampling and/or multisampling techniques. Memory interface 204 supplies all N samples for each pixel to FOS module 502. FOS module 502 implements an N× AA filter, blending the N samples to determine a single color value per pixel. That value is supplied as the pixel to display pipeline 202. Suitable implementations of FOS module 502 are known in the art.

It will be appreciated that a particular internal AA filter is not critical to the present invention. For instance, in one alternative embodiment, internal AA filtering might be performed within the rendering pipeline of GPU 122 using conventional techniques.

In graphics subsystems 400 (FIG. 4A) or 420 (FIG. 4B), each GPU 122 can include an FOS module 502 or other implementation of an internal N× AA filter. As long as the sampling points used by different GPUs do not coincide, combining an internal N× AA filter with a distributed AA filter provides a (G*N)× AA filter, where G is the number of GPUs. For instance, if the FOS module 502 in each GPU 122 provides a 4×AA filter, then graphics subsystem 400 of FIG. 4A provides up to 8×AA while graphics subsystem 420 of FIG. 4B provides up to 16×AA.

Figure 6A:
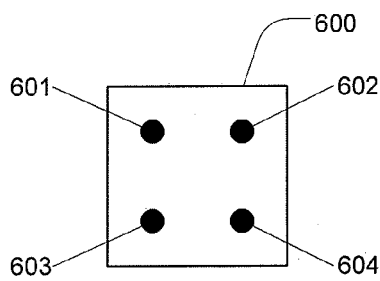
FIGS. 6A-6D illustrate sampling patterns usable in embodiments of the present invention.
Figure 6B:
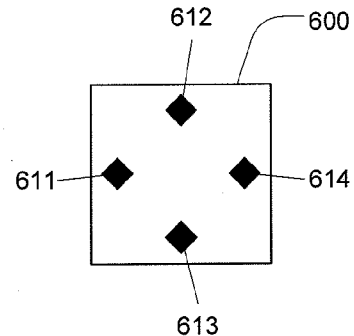

In some embodiments, the sampling points used by different GPUs are selected such that no two sampling points coincide. For example, FIG. 6A illustrates a "grid" sampling pattern applied to a pixel 600. The pixel is sampled four times, at regularly-spaced locations indicated by circles 601-604 within the pixel. FIG. 6B illustrates a "rotated grid" sampling pattern applied to pixel 600. The pixel is sampled four times, at locations indicated by diamonds 611-614, which are different from locations 601-604.

Figure 6C:
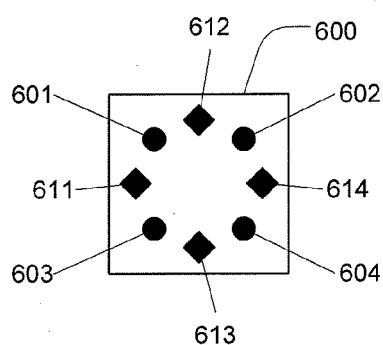

In one embodiment using graphics subsystem 400 of FIG. 4A, GPU 122(0) samples each pixel using the grid pattern of FIG. 6A while GPU 122(1) samples each pixel using the rotated grid pattern of FIG. 6B. As illustrated in FIG. 6C, this is equivalent to a circular sampling pattern with eight samples per pixel 600. Samples 601-604 are blended to a single value $P_{i0}$ by FOS module 502 in GPU 122(0); samples 611-614 are blended to a single value $P_{i1}$ by FOS module 502 in GPU 122(1); and display head 206a(0) in GPU 122(0) blends the values $P_{i0}$ and $P_{i1}$ to obtain a final pixel value that corresponds to an average over all eight samples 601-604, 611-614.

Figure 6D:
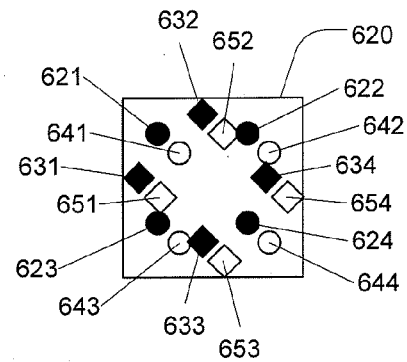

In an embodiment using graphics subsystem 420 of FIG. 4B, GPUs 122(0) and 122(2) each sample pixels using the grid pattern of FIG. 6A while GPUs 122(1) and 122(3) each sample pixels using the rotated grid pattern of FIG. 6B. The grid pattern used by GPU 122(0) is offset from the grid pattern used by GPU 122(2), and the rotated grid pattern used by GPU 122(2) is correspondingly offset from the grid pattern GPU 122(3). FIG. 6D illustrates the resulting sampling pattern for a pixel 620. GPU 122(0) generates and filters samples 621-624 (filled circles) to obtain pixel $P_{i0}$; GPU 122(1) generates and filters samples 631-634 (filled diamonds) to obtain pixel $P_{i1}$; GPU 122(2) generates and filters samples 641-644 (open circles) to obtain pixel $P_{i2}$; and GPU 122(3) generates and filters samples 651-654 (open diamonds) to obtain pixel $P_{i3}$. The resulting pixels $P_{i0}$, $P_{i1}$, $P_{i2}$, and $P_{i3}$ are then filtered using distributed AA as described above.

Figure 7A:
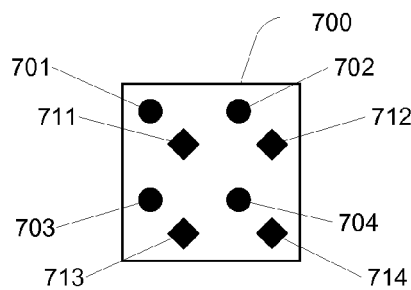
FIGS. 7A-7B illustrate further sampling patterns usable in embodiments of the present invention.

Other sampling patterns can also be used. For example, FIG. 7A illustrates a pixel 700 sampled using the grid pattern of FIG. 6A with two different offsets. In one embodiment using graphics subsystem 400 of FIG. 4A, GPU 122(0) samples pixel 700 with a first offset to generate samples 701-704 while GPU 122(1) samples pixel 700 to generate samples 711-714. GPU 122(0) filters samples 701-704 to obtain pixel $P_{i0}$ while GPU 122(1) filters samples 711-714 to obtain pixel $P_{i1}$. A distributed AA filter blends pixels $P_{i0}$ and $P_{i1}$ to determine the final pixel.

Figure 7B:
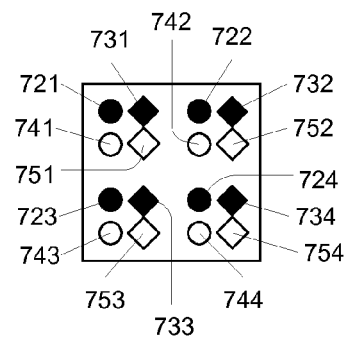

FIG. 7B illustrates a pixel 720 sampled using the grid pattern of FIG. 6A with four different offsets. In one embodiment using graphics subsystem 420 of FIG. 4B, each GPU applies a different one of the four offsets. For instance, GPU 122(0) might generate samples 721-724 (filled circles) while GPU 122(1) generates samples 731-734 (filled diamonds), GPU 122(2) generates samples 741-744 (hollow circles), and GPU 122(3) generates samples 751-754 (hollow diamonds). FOS module 502 in GPU 122(0) filters samples 721-724 to a single pixel $P_{i0}$; similarly, FOS modules 502 in GPUs 122(1)-122(3) filter samples 731-734, 741-744, and 751-754 to $P_{i1}$, $P_{i2}$, and $P_{i3}$, respectively. As described above, pixel selection logic 300 in the display heads 214a of GPUs 122(0)-122(3) filters the four pixels $P_{i0}$, $P_{i1}$, $P_{i2}$, and $P_{i3}$ to obtain a final pixel $P_{final}$, which corresponds to an average of all 16 samples.

It will be appreciated that the sampling patterns described herein are illustrative and that variations and modifications are possible. The present invention is not limited to grid sampling or to any other regular sampling pattern. For instance, anisotropic, random, or pseudorandom patterns may be used; in some instances some of the sample locations might coincide. Further, it is not required that all samples be given equal weights, either in the internal AA filter or in the distributed AA filter.

Distributed Antialiasing in Workstations

Figure 8:
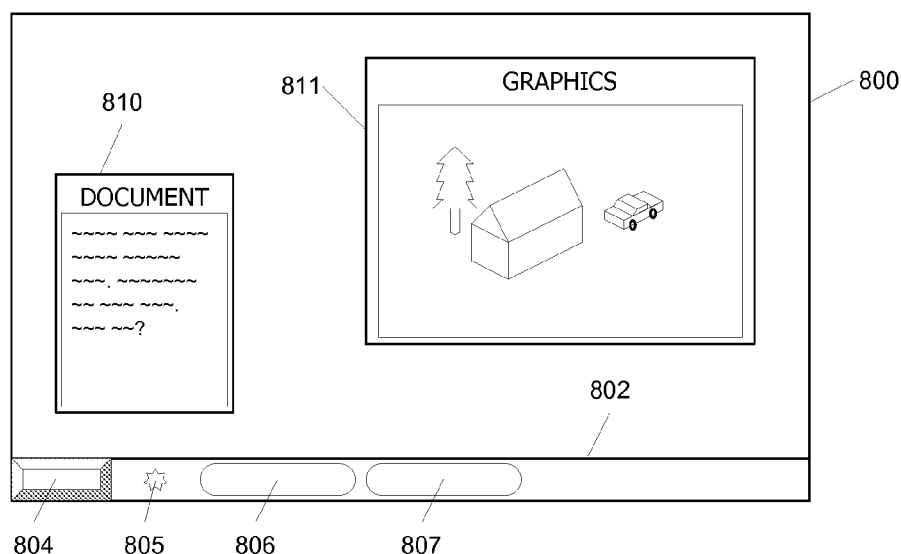
FIG. 8 illustrates a desktop image to which distributed antialiasing in accordance with an embodiment of the present invention can be applied.

In some embodiments, distributed antialiasing is employed in a computer workstation, which may be a computer system having an architecture of the type shown in FIG. 1. In a workstation, an operating system program executing on CPU 102 defines a "desktop" that is displayed on display 110. FIG. 8 illustrates a desktop 800 of a generally conventional nature, to which distributed AA in accordance with an embodiment of the present invention can be applied. The user interacts with desktop 800 to launch, exit, and interact with various application programs such as word processors, document browsers, video games, computer-aided design (CAD) tools, and so on. As is known in the art, desktop 800 generally includes a control area 802 populated with various icons 804-807 that the user can activate (e.g., by clicking with a mouse) to control operation of the workstation. Desktop 800 also displays various windows 810, 811 that provide interfaces to application programs. For example, window 810 provides an interface to a word processing program via which the user can create and edit documents. Window 811 provides an interface to a CAD program via which the user can define and manipulate 3-D representations of various objects.

As is known in the art, desktop 800 is generated by CPU 102. CPU 102 can delegate generation of pixels for any or all of windows 810, 811 to graphics subsystem 112. Typically, graphics subsystem 112 generates pixels for graphics-intensive applications (e.g., the CAD program associated with window 811) while CPU 102 generates pixels for the desktop itself and for any applications (e.g., the word processing program associated with window 810) for which relatively little computation is required to determine pixel color. For purposes of the present description, it is assumed that GPUs 122 of graphics subsystem 112 generate pixels within window 811 while CPU 102 generates all other pixels for desktop 800.

Pixels generated by CPU 102 are advantageously broadcast to all GPUs 122 in graphics subsystem 112. Each GPU 122 stores the broadcast pixels in its frame buffer (e.g., in graphics memories 124). Depending on the distributed rendering mode that is in use, some or all of GPUs 122 generate pixels for window 811.

In accordance with an embodiment of the present invention, distributed AA filtering can be selectively applied to pixels within window 811 without requiring the display head(s) in any GPU 122 to have knowledge of which pixels are within window 811. Each GPU 122 renders the pixels for window 811 with different sampling locations (or sampling patterns), e.g., as described above. Each GPU 122 receives an identical set of pixel data for the rest of desktop 800 from CPU 102. Thus, in general, each GPU 122 will supply different pixel data for pixels in window 811 and identical pixel data for all other pixels of desktop 800.

If a distributed AA filter of the type described above, is performed for every pixel of desktop 800, only pixels in window 811 will be affected. The rest of the pixels in desktop 800 will not be affected, since each GPU 122 provides identical data for these pixels. This outcome corresponds to selectively performing the distributed AA resolve for pixels in window 811 but is simpler to implement because the pixel selection logic does not need to determine which pixel are within window 811. The pixel selection logic treats all pixels in the same way, and the desired behavior emerges automatically.

Gamma-Corrected Anti-Aliasing

As is known in the art, the intensity response of many display devices to input voltages is non-linear. Accordingly, in some embodiments, display pipeline 202 of GPU 122 (see FIG. 2) adjusts the pixel values to a non-linear scale that will produce a linear intensity response. For instance, as is known in the art, each pixel P may be converted to a "gamma-corrected" pixel $P^\gamma$ for some constant $\gamma$. The constant $\gamma$ is typically around 2.0-2.5, depending on the display device. A particular implementation of gamma correction is not relevant to the present invention, and a detailed description is omitted.

In embodiments of the present invention where display pipeline 202 performs gamma correction, gamma-corrected pixel values ($P_i^\gamma$ and $P_e^\gamma$) are presented to adder 308 of pixel selection logic 300 (FIG. 3). Where the pixel values are gamma corrected, the desired result of the addition operation is $(P_i+P_e)^\gamma$ rather than $P_i^\gamma+P_e^\gamma$. Accordingly, in some embodiments of the present invention, adder 308 is replaced with a pixel combiner that correctly (or approximately correctly) combines gamma-corrected pixels.

Figure 9:
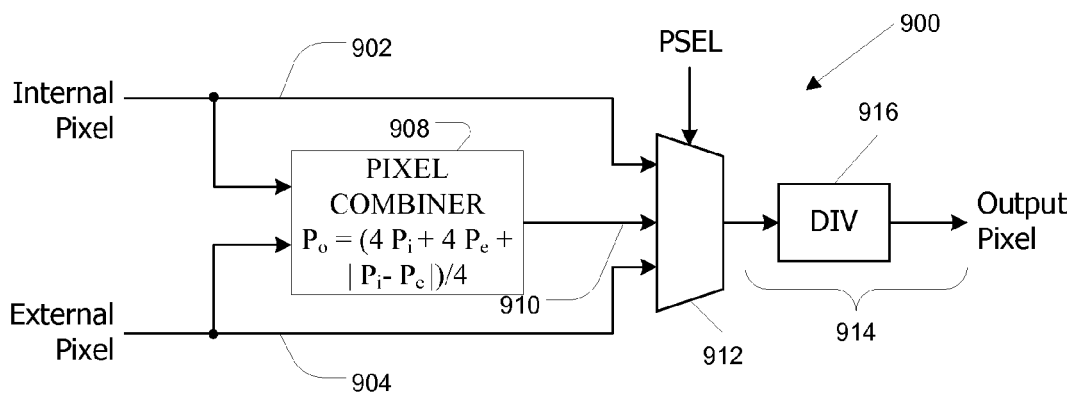
FIG. 9 is a block diagram of pixel selection logic for a multiprocessor graphics subsystem according to an alternative embodiment of the present invention.

FIG. 9 is a block diagram of pixel selection logic 900 according to an alternative embodiment of the present invention. Pixel selection logic 900 is generally similar to pixel selection logic 300 of FIG. 3 but is advantageously designed with the capability to blend gamma-corrected pixels. Pixel selection logic 900 receives an internal pixel on a first path 902 from display pipeline 202 of FIG. 2. The internal pixel is propagated to a pixel combiner 908. When MIO A port 214a is configured as an input port, pixel selection logic 900 also receives an external pixel on a second path 904. The external pixel is also propagated to pixel combiner 908.

Pixel combiner 908 combines the internal and external pixels, providing a blended pixel as a result on signal path 910. Pixel combiner 908 may include a division circuit similar to division circuit 306 of FIG. 3 on the internal and/or external pixel path. Pixel combiner 908 may also include an adder similar to adder circuit 308 of FIG. 3. In addition, or instead, pixel combiner 908 may include arithmetic logic for blending gamma-corrected pixels received on paths 902 and 904, as described below.

A selection multiplexer 912 receives the internal pixel on path 902, the external on path 904, and the blended pixel on path 910. In response to pixel selection signal (PSEL), selection multiplexer 912 selects one of these three candidate pixels for delivery to an output path 914 that connects to crossbar 220 of FIG. 2. Output path 914 may include a second division circuit 916, which may be similar to division circuit 314 of FIG. 3. In an alternative embodiment, two selection multiplexers, similar to those shown in FIG. 3, are used to select the output pixel, and division circuit 916 may be placed before the second selection multiplexer. Other selection circuit configurations may also be used.

Blending of gamma-corrected pixels in pixel combiner 908 will now be described. In some embodiments, pixel combiner 908 includes arithmetic logic circuits that remove the gamma correction from each input pixel, perform any additions and divisions on the uncorrected pixels, then reapply the gamma correction to the result. In an alternative embodiment, pixel combiner 908 includes arithmetic logic circuits that compute an approximation of $(P_i + P_e)^\gamma$, allowing a simpler implementation. For instance, for $\gamma \approx 2.2$, a gamma-corrected output pixel $P_o^\gamma$ can be computed using the equation:

$$P_o^\gamma = (4P_i^\gamma + 4P_e^\gamma + |P_i^\gamma - P_e^\gamma|)/4, \quad (\text{Eq. 4})$$

where $P_i^\gamma$ and $P_e^\gamma$ represent gamma-corrected pixels supplied on paths 902 and 904. Those skilled in the art will recognize that Eq. 4 provides an acceptable approximation using simpler hardware than computing an exact result would require. (For instance, multiplication and division by 4 can be implemented as bit shifts.) It will also be appreciated that other approximations may be substituted.

In some embodiments, pixel combiner 908 is configurable to operate on either gamma-corrected pixels or non-gamma-corrected (linear) pixels, with simple addition being used when the pixels are not gamma corrected. The configuration is advantageously established by the graphics driver during a setup operation (e.g., at system startup). It is to be understood that gamma-corrected AA filters are not required; in some embodiments, any gamma correction may be applied after final pixel selection.

Stereo Anaglyphs

In other embodiments of the present invention, pixel selection logic 300 of FIG. 3 (or pixel selection logic 900 of FIG. 9) is used in the generation of stereo anaglyphs. As is known in the art, in a stereo rendering process, two versions of the same scene—referred to herein as "right-eye" and "left-eye" views are generated. Typically, the same scene data is used for both views, but the viewport offset or viewpoint is shifted in each view so as to mimic the separation between a viewer's two eyes. In some cases, the viewplane normal is also shifted slightly from one eye to the other to mimic the eyes' stereoscopic focus on a particular point. Images so rendered are presented to the viewer in such a way that the viewer's left eye sees only the left-eye view while the viewer's right eye sees only the right-eye view; thus, the viewer experiences the two views as a single 3-D image.

A stereo anaglyph overlays the left-eye and right-eye views of the scene in a single image, typically with different color filters are advantageously applied to the left-eye pixels and the right-eye pixels. For instance, the right-eye pixels may be filtered with a red-pass filter while the left-eye pixels are filtered using a blue/green-pass filter. Due to the viewport or viewpoint offset, the left-eye pixel and right-eye pixel corresponding to the same point in the scene are in different places. To the naked eye, an anaglyph appears as a double image with distorted colors. To view the image properly, a viewer dons special glasses with a left lens that filters out the colors used for right-eye pixels and a right lens that filters out the colors used for left-eye pixels.

In accordance with an embodiment of the present invention, a multiprocessor graphics system with pixel selection logic 300 of FIG. 3 can be used in the generation of anaglyphs. For example, with reference to FIG. 4A. a rendering pipeline (not shown) of GPU 122(0) may be used to generate a right-eye view of a scene while a rendering pipeline (not shown) of GPU 122(1) generates a left-eye view of the same scene. One technique for rendering stereo images using multiple GPUs is described in co-pending U.S. patent application Ser. No. 11/112,413, filed Apr. 22, 2005, the disclosure of which is incorporated herein by reference for all purposes. Other techniques may also be used.

The right-eye pixels $P_{i1}$ and left-eye pixels $P_{i0}$ are advantageously color-filtered, either in the respective rendering pipelines of GPUS 122(0) and 122(1) or in respective display pipelines 202(0) and 202(1). In one embodiment, pixel color is specified using distinct red, green, and blue color components. Right-eye pixels can be filtered, e.g., by reducing the red component to zero and leaving the green and blue components unaltered; similarly, left-eye pixels can be filtered by reducing the green and blue components to zero and leaving the red component unaltered.

Right-eye pixels $P_{i1}$ are delivered to display head A 206a(1) of GPU 122(1). Display head 206(a) forwards pixels $P_{i1}$ to MIO A port 214a(1), which delivers them, as pixels $P_{o1}$ to MIO A port 214a(0) of GPU 122(0). Display head 206a(0) thus receives the right-eye pixels as external pixels.

Left-eye pixels $P_{i0}$ are delivered to display head 206a(0) as internal pixels. It should be noted that, because of the offset between the viewports or viewpoints used to generate the right-eye and left-eye views, corresponding left-eye and right-eye pixels processed by the pixel selection logic 300 are pixels at the same location in the anaglyph frame; in general, corresponding left-eye and right-eye pixels represent different locations in the scene.

In one embodiment display head 206a(0) includes pixel selection logic 300 of FIG. 3. For generating anaglyphs, division circuits 306 and 314 are both set to select a divisor of 1. Addition circuit 308 adds the left-eye pixel $P_{i0}$ and right-eye pixel $P_{i1}$ to produce a sum pixel on path 310 that, as a result of the earlier color filtering, has the red component of the left-eye pixel and the blue and green components of the right-eye pixel. Selection multiplexer 312 selects the sum pixel from path 310, and selection multiplexer 316 selects the blended pixel on path 315 as the output pixel.

In other embodiments, color filters prior to pixel selection logic 300 are not used. For example, selection multiplexers 312 and/or 316 can be configured such that the selection can be controlled independently for each color component. In one such embodiment, selection multiplexer 312 passes through all color components of left-eye pixel $P_{i0}$ from path 302, while selection multiplexer 316 passes through the red component of left-eye pixel $P_{i0}$ and the blue and green components of right-eye pixel $P_{i1}$. The result is an output pixel on path 318 that has the red component of the left-eye pixel and the blue and green components of the right-eye pixel.

Those skilled in the art will appreciate that more than two GPUs can be used for anaglyph rendering. In an embodiment with four GPUs (e.g., FIG. 4B), two GPUs can be used to generate the right-eye view while the other two GPUs are used to generate the left-eye view. The two GPUs generating each view can employ distributed antialiasing techniques as described above to improve the image quality of the anaglyph.

Further Embodiments

While the invention has been described with respect to specific embodiments, one skilled in the art will recognize that numerous modifications are possible. For instance, as noted above, any number of GPUs may be connected together to support higher degrees of AA filtering, and a variety of AA filtering algorithms may be implemented using distributed AA filtering. As noted above, divisors that are not powers of 2 can be supported (e.g., using lookup tables, general-purpose multipliers, or the like), further increasing the range of distributed AA filters available.

In addition, while pixel selection logic that performs distributed AA filtering is described as being included in a display head in each GPU, those skilled in the art will recognize that display heads could be implemented in one or more separate chips that receive input from two (or more) GPUs.

Further, distributed antialiasing is not limited to spatial antialiasing. For instance, in real-time animation applications, it is sometimes desirable to blend color samples across time to produce motion blur effects or to eliminate temporal aliasing effects (e.g., strobing). In accordance with an embodiment of the present invention, two or more GPUs could be used to render the same image at different time instants so that the distributed AA filter provides temporal antialiasing.

Thus, although the invention has been described with respect to specific embodiments, it will be appreciated that the invention is intended to cover all modifications and equivalents within the scope of the following claims.

What is claimed is:

1. A display head for a graphics processor comprising:
a first input path configured to propagate a first gamma-corrected pixel generated by a first graphics processor;
a second input path configured to propagate a second gamma-corrected pixel generated by a second graphics processor;
a pixel combiner coupled to the first input path and the second input path and configured to blend the first gamma-corrected pixel and the second gamma-corrected pixel to generate a blended pixel, wherein the blending approximates a gamma corrected blend of an external linear pixel and an internal linear pixel; and
a selection circuit configured to select one of the first gamma-corrected pixel, the second gamma-corrected pixel, or the blended pixel as an output pixel,
wherein the pixel combiner is configured to generate the blended pixel by computing an approximation of a gamma-corrected blend according to the formula:

$$(4P_i + 4P_e + |P_i - P_e|)/4,$$

where $P_i$ the first gamma-corrected pixel and $P_e$ is the second gamma-corrected pixel.

2. The graphics processor of claim 1 wherein the display head further includes:
a division circuit configured to divide the blended pixel by a divisor.

3. The graphics processor of claim 2 wherein the divisor is selected from a set of candidate divisors that includes the divisors 1 and 2.

4. The graphics processor of claim 2 wherein the divisor is selected from a set of candidate divisors that includes the divisors 1, 2, and 4.

5. The graphics processor of claim 1 wherein the pixel combiner includes a division circuit configured to divide the first gamma-corrected pixel by a divisor prior to blending the first gamma-corrected pixel and the second gamma-corrected pixel.

6. A graphics processor comprising:
a display pipeline configured to generate a first gamma-corrected pixel;
an input port configured to receive a second gamma-corrected pixel from an external pixel source; and
a display head having:
a first input path coupled to the display pipeline and configured to receive the first gamma-corrected pixel from the display pipeline;
a second input path coupled to the input port and configured to receive the second gamma-corrected pixel from the input port;
a pixel combiner coupled to the first input path and the second input path and configured to blend the first gamma-corrected pixel and the second gamma-corrected pixel to generate a blended pixel, wherein the blending approximates a gamma corrected blend of an external linear pixel and an internal linear pixel; and
a selection circuit configured to select one of the first gamma-corrected pixel, the second gamma-corrected pixel, or the blended pixel as an output pixel,
wherein the pixel combiner is configured to generate the blended pixel by computing an approximation of a gamma-corrected blend according to the formula:

$$(4P_i + 4P_e + |P_i - P_e|)/4,$$

where $P_i$ the first gamma-corrected pixel and $P_e$ is the second gamma-corrected pixel.

7. The graphics processor of claim 6 wherein the display pipeline includes:
a filter unit configured to apply an antialiasing filter to a plurality of sample values associated with the first gamma-corrected pixel.

8. The graphics processor of claim 6 further comprising:
a plurality of output ports; and
an output circuit coupled between the display head and the plurality of output ports,
wherein the output circuit is configured to selectably deliver the output pixel to one of the output ports.

9. The graphics processor of claim 8 wherein the plurality of output ports includes a first output port configured to be connected to an input port of another graphics processor.

10. A method of generating an image, the method comprising:
rendering a first set of gamma-corrected input pixels for the image using a first graphics processor;
rendering a second set of gamma-corrected input pixels for the image using a second graphics processor, wherein respective rendering operations performed by the first and second graphics processors differ in at least one respect;

delivering the first set of gamma-corrected input pixels and the second set of gamma-corrected input pixels to a first display head;

in the first display head, blending corresponding pixels of the first set of gamma-corrected input pixels and the second set of gamma-corrected input pixels to generate a first set of output pixels, wherein the corresponding pixels of the first set of gamma-corrected input pixels and the second set of gamma-corrected input pixels are blended to approximate a gamma-corrected blend of corresponding pixels of a first set of linear input pixels and a second set of linear input pixels, wherein the gamma-corrected input pixels are blended by computing an approximation of a gamma-corrected blend according to the formula:

$$(4P_i + 4P_e + |P_i - P_e|)/4,$$

where $P_i$ a first gamma-corrected pixel and $P_e$ is a second gamma-corrected pixel.

11. The method of claim 10 wherein the first display head is in the first graphics processor.

12. The method of claim 10 wherein the respective rendering operations performed by the first and second graphics processors differ with respect to a sampling pattern applied to each pixel.

13. The method of claim 10 wherein the respective rendering operations performed by the first and second graphics processors differ with respect to a viewport offset of the image being rendered.

14. The method of claim 10 wherein the respective rendering operations performed by the first and second graphics processors differ in that the rendering operation performed by the first graphics processor generates a left-eye view for a stereo anaglyph and the rendering operation performed by the second graphics processor generates a right-eye view for a stereo anaglyph.

15. The method of claim 10 wherein the image includes:
a workstation desktop having an application window defined thereon, the application window displaying a three-dimensional computer-generated graphic,
wherein the respective rendering operations performed by the first and second graphics processors differ with respect to pixels in the application window.

16. The method of claim 15 further comprising:
generating desktop pixels for an area of the workstation desktop outside the application window; and
delivering the desktop pixels to the first graphics processor and the second graphics processor,
wherein corresponding pixels in the first set of gamma-corrected input pixels and the second set of gamma-corrected input pixels are identical in the area of the workstation desktop outside the application window.

17. The method of claim 10 further comprising:
delivering the first set of output pixels to a display device.

18. The method of claim 10 further comprising:
rendering a third set of input pixels for the image using a third graphics processor;
rendering a fourth set of input pixels for the image using a fourth graphics processor, wherein respective rendering operations performed by the first, second, third, and fourth graphics processors differ from each other in at least one respect;
delivering the first set of output pixels and the third set of input pixels to a second display head;
in the second display head, blending corresponding pixels of the first set of output pixels and the third set of input pixels to generate a second set of output pixels;
delivering the second set of output pixels and the fourth set of input pixels to a third display head; and
in the third display head, blending corresponding pixels of the second set of output pixels and the fourth set of input pixels to generate a third set of output pixels.

19. The method of claim 18 wherein the second display head is in the third graphics processor and the third display head is in the fourth graphics processor.

20. The method of claim 19 wherein:
the act of blending corresponding pixels of the first set of gamma-corrected input pixels and the second set of gamma-corrected input pixels includes computing a quantity $P_{o1} = (P_{i1} + P_{i2})/2$, wherein $P_{i1}$ is a pixel of the first set of gamma-corrected input pixels, $P_{i2}$ is a pixel of the second set of gamma-corrected input pixels, and $P_{o1}$ is a pixel of the first set of output pixels;
the act of blending corresponding pixels of the first set of output pixels and the third set of input pixels includes computing a quantity $P_{o2} = (P_{o1} + P_{i3}/2)/2$, wherein $P_{i3}$ is a pixel of the third set of input pixels and $P_{o2}$ is a pixel of the second set of output pixels; and
the act of blending corresponding pixels of the second set of output pixels and the fourth set of input pixels includes computing a quantity $P_{o3} = P_{o2+Pi4}/4$, wherein $P_{i4}$ is a pixel of the fourth set of input pixels and $P_{o3}$ is a pixel of the third set of output pixels.

* * * * *